United States Patent Office 3,132,153
Patented May 5, 1964

3,132,153
2-SUBSTITUTED TESTOLS- AND ANDROLOLACTONES
Howard J. Ringold and Fred A. Kincl, Mexico City, Mexico, assignors, by mesne assignments, to Syntex Corporation, a corporation of Panama
No Drawing. Filed Oct. 29, 1959, Ser. No. 849,451
Claims priority, application Mexico Oct. 29, 1958
11 Claims. (Cl. 260—343.2)

This invention relates to certain new cyclopentano phenanthrene derivatives and to a process for the production of the same.

More particularly, the invention relates to new compounds having the general formulas

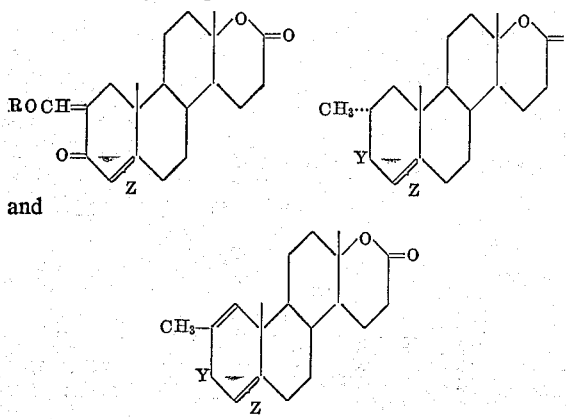

and wherein R is a member of the group consisting of hydrogen and the acyl radical of a hydrocarbon carboxylic acid having up to about 12 carbon atoms and the radical of a hydrocarbon having up to about 8 carbon atoms, Y is selected from the group consisting of

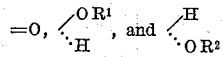

wherein $R^1$ is selected from the group consisting of hydrogen and the acyl radical of a hydrocarbon carboxylic acid having up to 12 carbon atoms; and Z is a member of the group consisting of

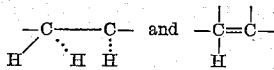

Rings A and B of the steroid nucleus are thus in trans-position when the $C^4$-to-$C^5$ bond is saturated.

More specifically, among the new compounds corresponding to the above formulas there are 2-hydroxymethylene-testololactone, 2-hydroxymethylene-4,5-dihydro-allo-testololactone, 2α-methyl-4,5-dihydro-allo-testololactone, 2-methyl-1-dehydro-testololactone, 2-methyl-1-dehydro-4,5-dihydro-allo-testololactone, 2α-methyl-androlo-lactone and 2α-methyl-epi-andrololactone; the new compounds according to this invention further comprise the esters of the aforementioned compounds formed with hydrocarbon carboxylic acids of up to about 12 carbon atoms, which acids are saturated or unsaturated, of straight, branched, cyclic or mixed cyclic-aliphatic chain, optionally substituted with functional groups (hydroxyl, acyloxy (of up to 12 carbon atoms), alkoxy (of up to 5 carbon atoms), halogen (fluorine, chlorine or bromine) or other groups); typical new esters of such acids are, among others, the acetates, propionates, butyrates, hemisuccinates, enanthates, caproates, benzoates, trimethylacetates, phenoxyacetates, cyclopentylpropionates, phenylpropionates and β-chloropropionates. The hydrocarbon oxymethylene group at C-2 may be formed with an aliphatic alcohol of up to about 5 carbon atoms, with an aromatic alcohol or with a mixed aliphatic-aromatic alcohol. Typical alkoxy groups are the methoxy, ethoxy, and propoxy groups, and a typical aroxy group is the benzoxy group.

The new compounds which are the object of the present invention, are anabolic drugs showing a favorable anabolic-androgenic ratio, which inhibit the gonadotropins and possess anti-estrogenic activity. Particularly, the compounds substituted at C–2 are distinguished from their unsubstituted analogs by exhibiting a higher activity by the oral route.

The above-described new compounds are produced by a process according to the present invention which comprises, as an essential feature, the use of starting compounds having the general formula

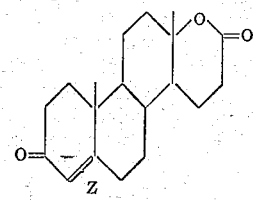

in which Z has the same meaning as defined hereinbefore; these starting compounds are testololactone and 4,5-dihydro-allo-testololactone, described by Levy and Jacobsen in "Journal Biol. Chem." 171, p. 71 (1947).

The production of the 2-methyl derivatives of 4,5-dihydro-allo-testololactone according to the process of our invention is illustrated by the following Reaction Diagram I, in which Z has the above-explained meaning:

REACTION DIAGRAM I

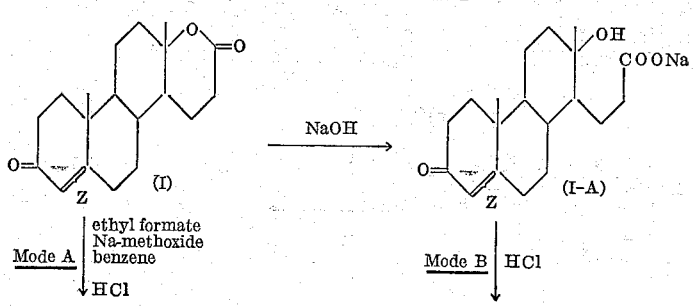

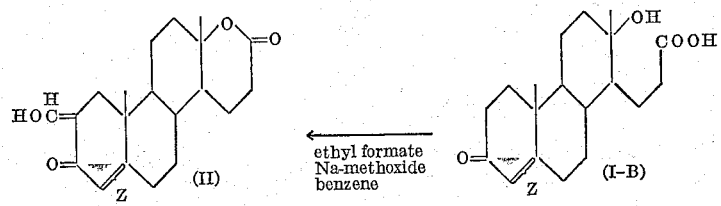

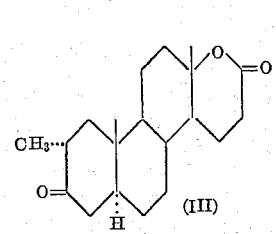

and which process involves, according to a first mode of operation A, the introduction of the hydroxymethylene group at C-2 into the above-mentioned starting material I by reacting the latter, i.e., testololactone or 4,5-dihydro-allo-testololactone, in benzene solution with ethyl formate in the presence of sodium methoxide and acidifying the reaction product with hydrochloric acid. The hydroxymethylene group of the resulting 2-hydroxymethylene testololactone or 2-hydroxymethylene-4,5-dihydro-allo-testololactone (II) is then hydrogenated in methanol solution and in the presence of palladium on carbon to obtain 2α-methyl-4,5-dihydro-allo-testololactone (III).

We have further made the surprising discovery that unexpectedly, the yield of the above mode A of carrying out this phase of the process of our invention in practice, can be improved and undesirable side reactions leading to condensations at C–16 which occur in the above-described process step can be eliminated by mode B of carrying out the process according to the invention.

This improved mode of operation B comprises the conversion of the starting material I to the corresponding testololactonic or 4,5-dihydro-allo-testololactonic acid (I-B) by first reacting the starting material with an alkali metal hydroxide under nitrogen, and then acidifying the intermediate (I-A) with a dilute mineral acid such as hydrochloric acid.

The acid intermediate (I-B) is then subjected to the same treatment as described under mode A hereinbefore, in order to obtain first 2-hydroxymethylene testololactone or 2-hydroxymethylene - 4,5 - dihydro-allo-testololactone (II) and thereafter 2α-methyl-4,5 - dihydro-allo-testololactone (III).

The intermediary 2-hydroxymethylene derivatives of general Formula II are converted by conventional esterification with the aid of a hydrocarbon carboxylic acid anhydride or chloride to the respective 2-acyloxy methylene derivatives (VIII) according to the reaction equation:

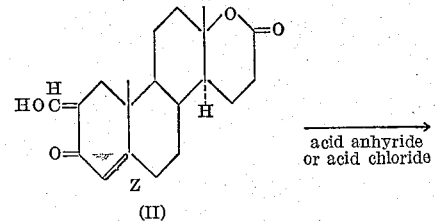

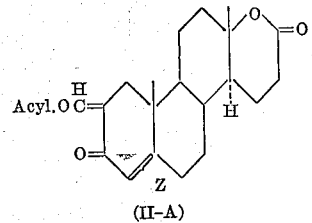

The next following phase in the process according to our invention comprises more particularly a novel method illustrated in the following Reaction Diagram II:

REACTION DIAGRAM II

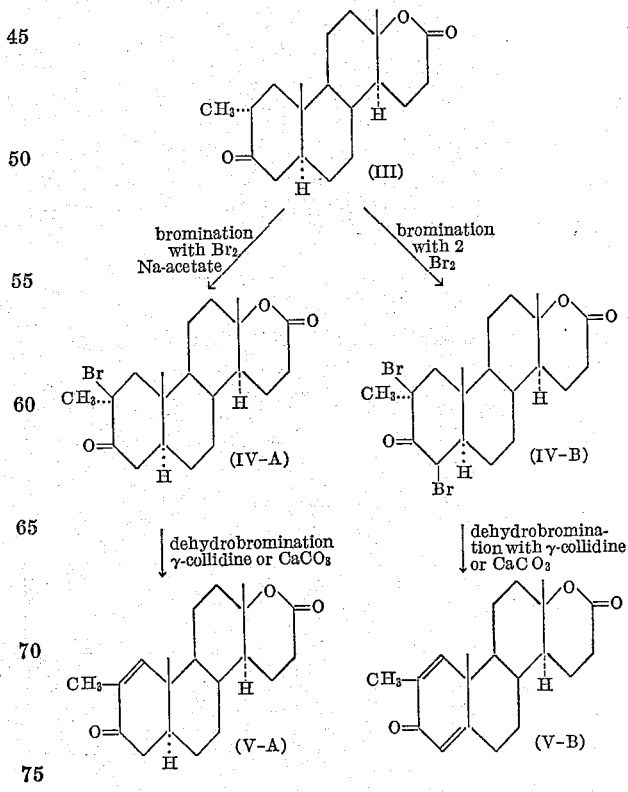

according to which method we introduced a double bond at C–1 alone by first treating a solution of the intermediate (III) in acetic acid with a solution of approximately 1 molar equivalent of bromine in acetic acid containing 1 molar equivalent of sodium acetate, followed by dehydrobromination of the resulting 2-methyl-2-bromo-4,5-dihydro-allo-testololactone (IV) to 2-methyl-1-dehydro-4,5-dihydro-allo-testololactone (V), by refluxing with γ-collidine or by reaction with calcium carbonate in mixture with dimethylacetamide. Alternatively, there were introduced two double bonds at C–1 and C–4 of 2α-methyl-4,5-dihydro-allo-testololactone (III) by treatment with about 2 molar equivalents of bromine in acetic acid, without, however, adding sodium acetate, followed by dehydro-bromination of the resulting 2-methyl-2,4-dibromo-4,5-dihydro-allo-testololactone (IV–A) as described above to 2-methyl-1-dehydro-testololactone (V–A).

We thus found unexpectedly, in this phase of the process according to our invention, that the treatment with one mole of bromine of the intermediate novel 2-methyl-4,5-dihydro-allo-testololactone (III) leads to a selective introduction of bromine at C–2 alone, i.e., by substitution of the tertiary hydrogen atom at C–2 (IV) and the treatment with 2 moles of bromine leads to the formation of the 2,4-dibromo compound (IV–A), while no or negligible bromination takes place at ring D, for instance at C–16, i.e., in the α-position relative to the 17-keto group although C–16 corresponds to C–2 in that it is in α-position to the 3-keto group and a similar bromination was therefore to be expected at both carbon atoms.

The above-described novel selective bromination and successive dehydrobromination can also be effective with 2-unsubstituted 4,5-dihydro-allo-testololactone.

By reaction of a solution of 4,5-dihydro-allo-testololactone in acetic acid with 1 molar equivalent of bromine dissolved in acetic acid containing 1 equivalent of sodium acetate we obtained 2-bromo-4,5-dihydro-allo-testololactone, which upon dehydrobromination as described above yielded 1-dehydro-4,1dihydro-allo-testololactone.

According to another important feature of our invention, the new intermediary 2α-methyl-4,5-dihydro-allo-testololactone (III, in the above Reaction Diagram I) can be converted as illustrated in Reaction Diagram III below, by reduction of the 3-keto group to the corresponding androlactone derivatives (VI–A, VI–B).

REACTION DIAGRAM III

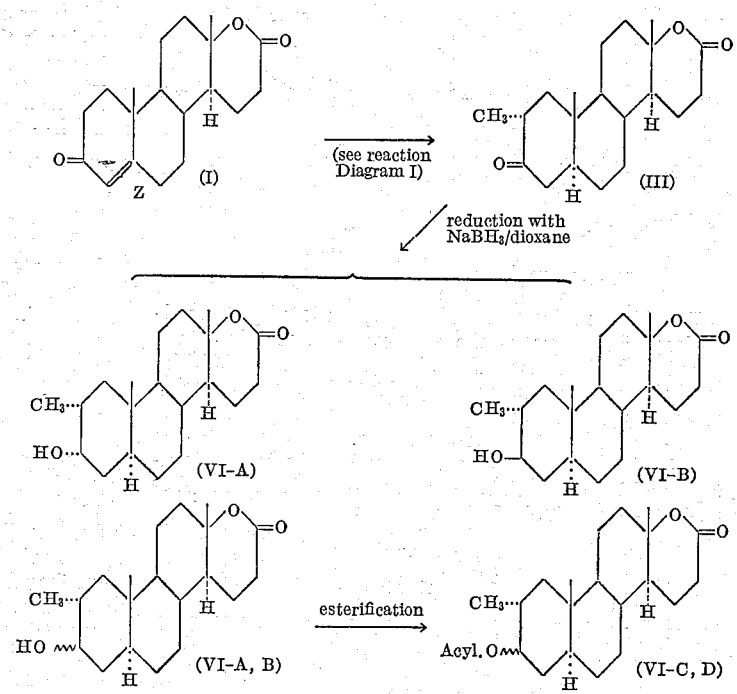

According to the above-illustrated phase of the process according to our invention, the reaction of a solution of 2α-methyl-4,5-dihydro-allo-testololactone (III) in dioxane with sodium borohydride dissolved in water, followed by heating the reaction product with hydrochloric acid yields a mixture of 2α-methyl-androlactone (VI–A) and 2α-methyl-epi-androlactone (VI–B); the stereoisomers are separated by chromatography. The hydroxy group at C–3 present in the latter compounds VI–A and VI–B is esterified by employing conventional techniques, and esters VI–C and VI–D are thus obtained.

By the same reduction with sodium borohydride in dioxane as described in Reaction Diagram III, compounds V–A and V–B are converted to a mixture of the corresponding 3α- and 3β-hydroxy derivatives VII–A, B and VII–C, D, respectively as shown in Reaction Diagram IV below:

REACTION DIAGRAM IV

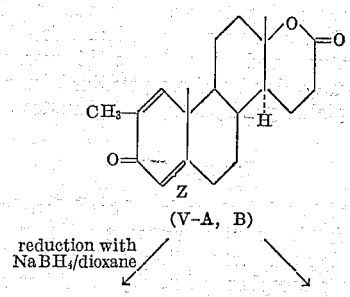

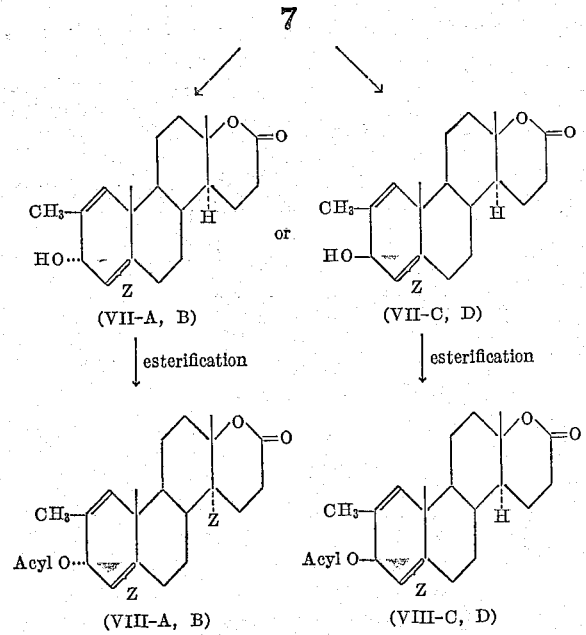

Esterification by conventional methods yields the 3-acyloxy derivatives of the aforesaid compounds, correspond to the formulas VIII A, VIII B, VIII C and VIII D.

In this application the wavy line (∫) when appearing at the 3-position is a generic expression which includes the α- as well as the β-configuration.

Z in the above reaction diagram has the same meaning as explained hereinbefore; in compounds VII–A, VII–C, VIII–A and VIII–C, Z is $$\underset{H\phantom{-}H\phantom{-}H}{C^4\!\!-\!\!C^5}$$

in compounds VII–B, VII–D, VIII–B and VIII–D, Z is $$\underset{H}{C^4\!\!=\!\!C^5}$$

The conditions of the aforementioned reactions as described in detail in the examples given hereinafter, can be modified within relatively wide limits. The following are some of the possible modifications: the introduction of the hydroxymethylene group can also be achieved in the presence of a catalyst other then sodium methoxide, such as sodium hydride; the dehydrogenation at C–1 can be effected, although with inferior yields, by microbiological methods, such as incubation with *Corynebacterium simplex* ATCC 6946.

The invention is further illustrated but not limited by the following examples:

Example I

A mixture of 5 g. of testololactone (I), 175 cc. of anhydrous benzene free of thiophene, 1 g. of sodium methoxide and 10 cc. of ethylformate was stirred at room temperature for 4 hours. The precipitate was collected by filtration and added with vigorous stirring to 200 cc. of ice-water containing 10 cc. of concentrated hydrochloric acid. The stirring was continued for 4 hours at room temperature and then the solid was collected, washed with water, dried and recrystallized from acetone-hexane, thus yielding 2-hydroxymethylene-testololactone (II).

Example II

One gram of testololactone is refluxed for three hours in mixture with 100 cc. of an aqueous solution of sodium hydroxide having a concentration of 2 g. of NaOH per liter, under an atmosphere of nitrogen. After cooling to 0° C., the mixture is acidified with diluted hydrochloric acid which latter is added dropwise until the mixture has attained a pH of 3. The resulting precipitate is separated by filtration, washed with water and then dried under reduced pressure, whereby testololactonic acid (II–B) is obtained.

A mixture of 2.8 g. of testololactonic acid, 200 cc. of benzene, 3 g. of sodium methoxide, and 10 cc. ethylformate is stirred for five hours under an atmosphere of nitrogen and at room temperature. The resulting precipitate is filtered off, washed consecutively with benzene and hexane, and dried under reduced pressure. The resulting product in powder form is added to a mixture of 200 cc. of water and 50 cc. of concentrated hydrochloric acid, which is then stirred at room temperature for 72 hours. The resulting solid phase is separated by filtration, washed with water, dried and recrystallized from acetone-hexane, whereby 2-hydroxymethylene-testololactone (II), identical with the final product of Example I, is obtained in a considerably higher yield.

Example III

Example II was repeated with 4,5-dihydro-allo-testololactone as the starting material, and there was first obtained 4,5-dihydro-allo-testololactonic acid. M.P. 195–200° C., $[\alpha]_D$ +4° (chloroform), and then 2-hydroxymethylene-4,5-dihydro-allo-testololactone (II), M.P. 169–173° C., $[\alpha]_D$ +8° (chloroform); $\lambda_{max}$ 282 mμ (log e 4.00).

Example IV 5 g. of 4,5-dihydro-allo-testololactone was treated with ethylformate, as described for this reaction in Example I to produce 2-hydroxymethylene-4,5-dihydro-allo-testololactone (II).

A solution of 3 g. of the above compound in 100 cc. of methanol containing 600 mg. of a pre-reduced 5% palladium on carbon catalyst was hydrogenated at room temperature until the equivalent of 2 moles of hydrogen had been absorbed; the catalyst was removed by filtration, the methanol was evaporated and the residue crystallized from acetone-hexane, thus affording 2α-methyl-4,5-dihydro-allo-testololactone (III), M.P. 164–167° C., $[\alpha]_D$ −19° (chloroform).

Example V

To a solution of 2 g. of 2α-methyl-4,5-dihydro-allo-testololactone, produced according to Example IV, in 100 cc. of glacial acetic acid there was slowly added 50 cc. of glacial acetic acid containing 1.1 molar equivalent of bromine and 1.1 molar equivalent of sodium acetate, under stirring and while maintaining the temperature below 20° C. Stirring was continued until almost complete decoloration of the reaction mixture had been attained; the mixture was then poured into ice-water; the resulting precipitate was collected, washed with water and dried under reduced pressure. There was thus obtained the crude 2-methyl-2-bromo-4,5-dihydro-allo-testololactone (IV). This crude product was refluxed for one hour with 50 cc. of γ-collidine and the mixture was cooled, diluted with ether, filtered, washed with dilute hydrochloric acid and then with water to neutral, dried and evaporated to dryness; recrystallization of the residue from acetone-hexane afforded 2α-methyl-1-dehydro-4,5-dihydro-allo-testololactone (V).

Example VI

A solution of 3 g. of 2α-methyl-2-bromo-4,5-dihydro-allo-testololactone, prepared in accordance with the previous example, in 20 cc. of dimethylacetamide was added to a boiling suspension of 1.5 g. of calcium carbonate in 30 cc. of dimethylacetamide and the mixture was refluxed for 15 minutes, cooled and acidified with concentrated hydrochloric acid to a strong acidic reaction. The mixture was heated for one hour on a steam bath, cooled, and diluted with ice-water, and the resulting precipitate was collected by filtration, washed with water, dried and recrystallized from acetone-hexane. There was thus obtained 2α-methyl-1-dehydro-4,5-dihydro-allo-testololactone, identical with the final compound in the previous example.

*Example VII*

By following the procedure of Example IV, 2 g. of 2α-methyl-4,5-dihydro-allo-testololactone was treated with 2 equivalents of bromine in glacial acetic acid, but in the absence of sodium acetate which serves as a buffer in the method of Example IV. There was obtained 2-methyl-2,4-dibromo-4,5-dihydro-allo-testololactone in crude form, which was divided in two parts. Each part was then dehydro-brominated, one by the method described in Example IV and the other by the method described in Example VI. In both cases there was obtained 2α-methyl-1-dehydro-testololactone.

*Example VIII*

The method of monobromination at C-2 described in Example IV was applied to 4,5-dihydro-allo-testololactone, thus yielding 2-bromo-4,5-dihydro-allo-testololactone. A portion of this compound was dehydrobrominated in accordance with the method of Example IV, and the other in accordance with the method of Example V. In both cases there was obtained 1-dehydro-4,5-dihydro-allo-testololactone.

*Example IX*

To a solution of 2 g. of 2α-methyl-4,5-dihydro-allo-testololactone (III) obtained according to Example IV in 50 cc. of dioxane there was slowly added a solution of 500 mg. of sodium borohydride in 10 cc. of water, under stirring at room temperature; stirring was continued for 2 hours, the excess of hydride was decomposed by the addition of acetic acid and then 2 cc. of concentrated hydrochloric acid was added. The mixture was heated on the steam bath for one hour, then poured into ice-water, and the resulting precipitate was collected by filtration, washed with water and dried; there was thus obtained a mixture of 2α-methyl-androlactone (3α-OH) and of 2α-methyl-epi-androlactone (3β-OH). The stereoisomers were separated by chromatography on neutral alumina.

*Example X*

A solution of 1 g. of 2-hydroxymethylene-testololactone in 5 cc. of pyridine was treated with 1 cc. of acetic anhydride; on the next day the reaction mixture was poured into water, the formed precipitate was collected, washed with water, dried and recrystallized from acetone-hexane. There was thus obtained 2-acetoxymethylene-testololactone (II-A).

*Example XI*

A solution of 1 g. of 2-hydroxymethylene-4,5-dihydro-allo-testololactone in 5 cc. of pyridine was treated with 1 g. of benzoyl chloride, kept at room temperature for 24 hours, poured into water, heated for one hour on the steam bath, cooled and the precipitate was collected, washed with water, dried and recrystallized from acetone-hexane. There was thus obtained 2-benzoyloxymethylene-4,5-dihydro-allo-testololactone.

*Example XII*

A mixture of 1 g. of 2α-methyl-epi-androlactone, 5 cc. of pyridine and 2 cc. of cyclopentylpropionic acid anhydride was kept for 48 hours at room temperature, poured into water, heated for 2 hours on the steam bath and cooled. The precipitate was collected, washed with water, dried and recrystallized from acetone-hexane, thus affording 2α-methyl-epi-androlactone cyclopentylpropionate.

We claim:
1. A compound of the following formula:

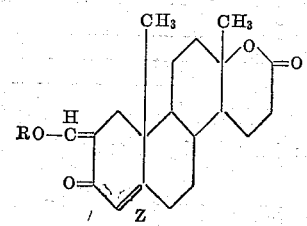

wherein R is selected form the group consisting of hydrogen, alkyl of up to 5 carbon atoms, aryl of up to 8 carbon atoms and hydrocarbon carboxylic acyl of up to 12 carbon atoms and Z is selected from the group consisting of

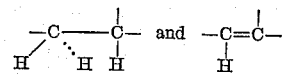

2. 2-hydroxymethylene-testololactone.
3. 2-hydroxymethylene-4,5-dihydroallotestololactone.
4. A compound having the formula

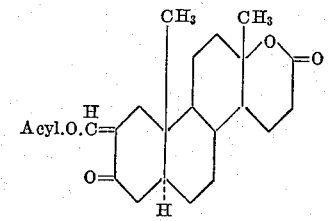

wherein acyl represents hydrocarbon carboxylic acyl of up to 12 carbon atoms.

5. A compound having the formula

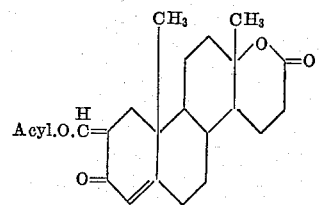

wherein acyl represents hydrocarbon carboxylic acyl of up to 12 carbon atoms.

6. A compound of the following formula:

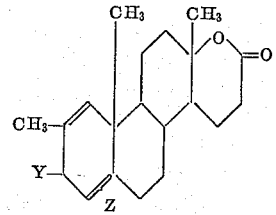

wherein Z is selected from the group consisting of

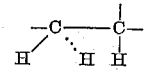

and

and Y is selected from the group consisting of keto, β-hydroxy, α-hydroxy, β-hydrocarbon carboxlic acyloxy of up to 12 carbon atoms and α-hydrocarbon carboxylic acyloxy of up to 12 carbon atoms.

7. 2-methyl-1-dehydro-4,5-dihydro-allotestoloactone.
8. 2-methyl-1-dehydro-androlactone.
9. 2-methyl-1,4-bis-dehydro-androlactone.
10. 2-methyl-1-dehydro-epi-androlactone.
11. 2-methyl-1,4-bis-dehydro-epi-androlactone.

(References on following page)

References Cited in the file of this patent

UNITED STATES PATENTS

| | | |
|---|---|---|
| 2,837,464 | Nobile | June 3, 1958 |
| 2,837,535 | Dodson | June 3, 1958 |
| 2,946,807 | Fried et al. | July 26, 1960 |

OTHER REFERENCES

Levy et al.: Jour. Biol. Chem., vol. 171, pages 71–79 (1947).

Djerassi: Jour. Amer. Chem. Soc., vol. 71 (1949), pages 1003–1005.

Hogg et al.: Jour. Amer. Chem. Soc., vol. 77 (1955), pages 6401, 6402.

Wendler et al.: Jour. Amer. Chem. Soc., vol. 77 (1955), pages 3559–3561.

Gordan: Chemical Abstracts, vol. 52 (1958), page 8355.

Fieser et al.: Steroids, Reinhold (Apr. 1959), pages 291–294.

Yanagita et al.: Jour. Org. Chem., vol. 21, 1956, pages 949, 950, 952 and 954.